Jan. 3, 1956   D. E. BAIRD   2,728,964
CORSAGE HOLDER
Filed March 4, 1952
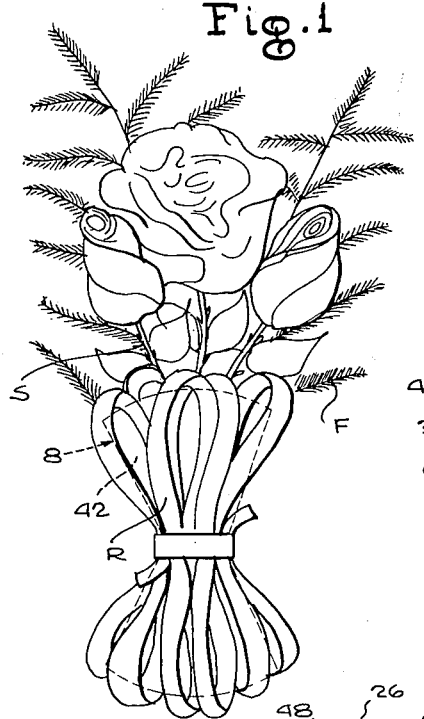
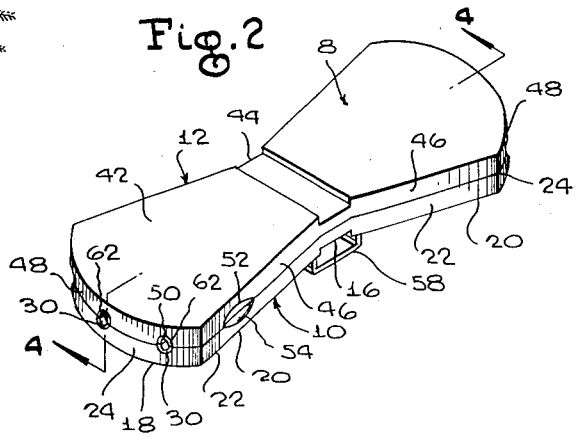
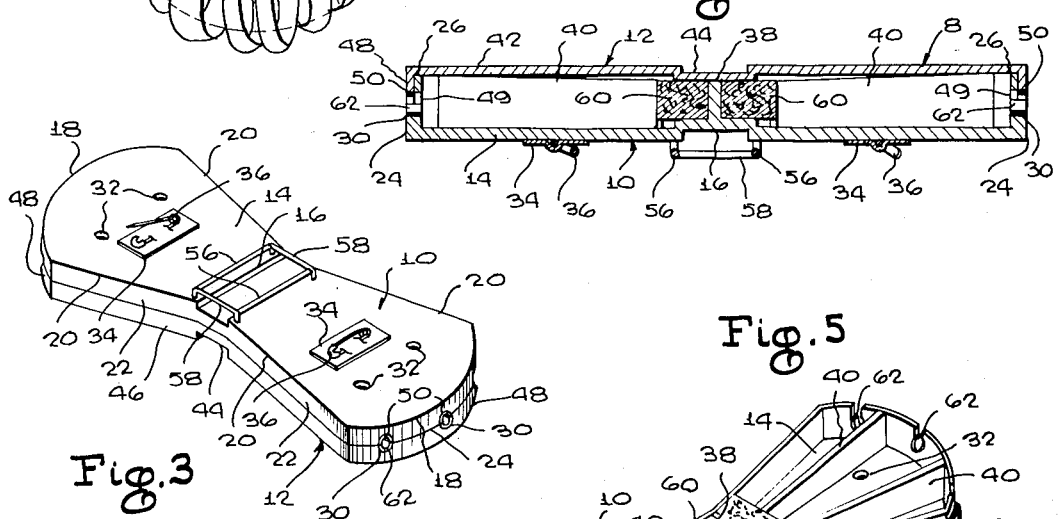
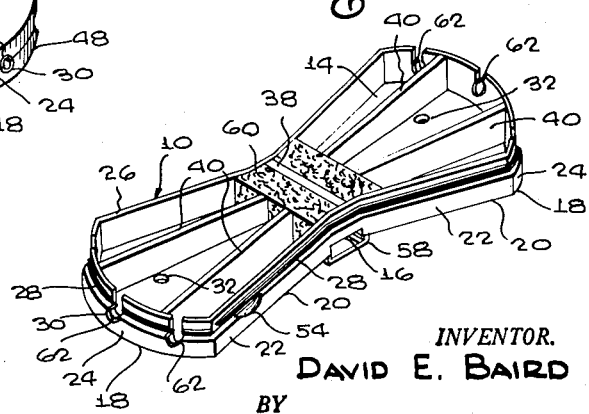
INVENTOR.
DAVID E. BAIRD
BY
McMorrow, Berman & Davidson
ATTORNEYS United States Patent Office 2,728,964
Patented Jan. 3, 1956

2,728,964
CORSAGE HOLDER
David E. Baird, Lock Haven, Pa.
Application March 4, 1952, Serial No. 274,788
8 Claims. (Cl. 24—5)

This invention relates to a device usable for forming a corsage, and adapted to be attached to one's gown, or alternatively, worn about the neck or upon the wrist.

The common practice, in making a corsage, is to hold the flowers, ferns, or other parts of the corsage together, after which they are wired. Even after one becomes adept in making corsages, the operation consumes a certain amount of time, and this is particularly undesirable on particular days of the year when trade in a florist's shop is unusually heavy.

Additionally, the present practice in forming corsages has the effect of damaging the stems of the flowers used in the corsage, as a result of which the corsage tends to deteriorate in a short time. The tendency toward deterioration is, of course, accelerated by reason of the fact that the stems of the flowers do not have access to water. As a result, it is necessary that corsages made in the conventional manner must be placed within a refrigerator at all times when they are not actually being worn, in order to preserve the appearance thereof.

The broad object of the present invention, accordingly, is to provide a holder for a corsage so formed as to permit the insertion therein of selective flowers or ferns, the holder being further adapted for tying of a corsage ribbon thereabout in a manner effective to conceal the holder entirely when the corsage is completed. In this way, it is proposed to permit the making of a corsage with far greater speed and facility than has heretofore been the case, and it is further proposed to permit all corsages made with the holder to have a desired uniformity and attractiveness of appearance, even though fashioned by a relatively unskilled worker.

Another important object is to provide a holder as described which is not only formed to permit the flowers and ferns to be arranged in a selected relationship, but also will keep the flowers fresh, thus to preserve the attractive appearance of the corsage for a greater length of time than has heretofore been possible.

Yet another important object is to provide a holder as stated which will be of simple design, so as to be readily molded from plastic material, thus to permit manufacture of the holder at low cost.

A still further important object is to provide a corsage holder as described having means incorporated therein that will permit the corsage to be readily attached to the gown or coat of a wearer, or alternatively, worn on a choker or wristlet.

Yet another important object is to provide a corsage holder which, after its initial use, can be preserved for subsequent uses by the purchaser.

Other objects will appear from the following description, the claims appended thereto, and from the annexed drawing, in which like reference characters designate like parts throughout the several views, and wherein:

Figure 1 is an elevational view of a partially completed corsage formed with a holder made according to the present invention;

Figure 2 is a perspective view of the holder, as it appears when viewed from above;

Figure 3 is a bottom perspective view of the holder;

Figure 4 is a longitudinal sectional view through the holder, taken substantially on line 4—4 of Figure 2; and Figure 5 is a perspective view of the bottom section of the holder.

The corsage holder formed in accordance with the present invention includes a container which I have designated generally by the reference numeral 8. The container 8 is of sectional construction, and comprises a bottom or base section 10, and a cover section 12. The sections 10 and 12 are complementary, and are capable of being readily interfitted to form the container.

Considering first the construction of the bottom section 10, this is of generally flat, shallow formation, and includes a flat, relatively elongated, bottom plate 14, the mid-length portion of which is narrowed and formed, exteriorly of the bottom section, with a wide, shallow, transverse groove 16 extending fully from side to side of the bottom section. In this connection, the bottom section, as well as the cover section 12, can be readily formed in one piece from molded plastic or the like, and the groove 16 can be provided in the bottom section by offsetting upwardly the mid-length portion of the bottom section in the manner best shown in Figure 4, this operation being readily permitted during the molding of the bottom section.

The bottom section 10 is increased progressively in width from the mid-length portion thereof toward the opposite ends of said section, and at said ends, the bottom section is formed with outwardly bowed, arcuate, end edges 18. Between the end edges 18 and the narrow mid-length portion of the bottom section 10, the side edges 20 of the bottom section are of straight formation, and converge from each end of the bottom section in the direction of the narrow mid-length portion.

Upstanding from the respective side edges 20 of the bottom section 10 are low side walls 22, said side walls merging at the outer ends of the bottom section 10 into low, upstanding end walls 24 that extend upwardly from the arcuate end edges 18. A peripheral, upstanding, inwardly offset flange 26 is integral with the respective side and end walls, and extends through the full periphery of the bottom section 10, said flange having its outer surface formed with outwardly directed locking ribs 28. As will be noted from Figure 5, the locking ribs 28 are provided both along opposite sides of the bottom section and at the opposite ends of said bottom section, and can in fact be formed as a continuous rib extending through the full periphery of the upstanding flange 26, if desired.

Formed in the respective end walls 24 of the bottom section 10 are stem-receiving recesses 30, a series of said recesses being provided at each end of the bottom section, with the recesses of each series being spaced transversely of the bottom section. These recesses are adapted to receive the stems S of a plurality of flowers (see Figure 1), so that said stems will be spaced from one another in a selected relationship, during the formation of the corsage.

In the bottom or base plate 14 of the bottom section 10, I form, in closed spaced relation to the end walls of the section, transversely spaced apertures 32 (Figure 3), these being provided for the purpose of permitting the insertion of the stems of ferns F.

The bottom section also includes means for attachment thereof to the gown, coat or other garment of a wearer, said means comprising clips secured to the bottom plate 14 in an arrangement wherein said clips are spaced equidistantly from the narrowed mid-length portion of the section. Each clip includes, in the preferred embodiment of the invention, an adhesive tape 34, through which a conventional safety pin 36 may be extended, said tape 34 being adhesively secured to the outer or bottom surface of the plate 14.

In the illustrated embodiment of the invention, the bottom section 10 is molded integrally with a transverse partition 38 disposed medially between the opposite ends of the bottom section, said partition extending upwardly from the inwardly offset mid-length portion of the bottom section as best shown in Figure 4. In some forms of the invention, I might prefer to eliminate the transverse partition entirely, this modification being believed sufficiently obvious as not to require special illustration herein.

Molded integrally with the bottom plate 14 are longitudinal partitions 40 disposed within the bottom section 10. Said partitions 40 extend upwardly from the inner surface of the bottom plate, and are rigid at their outer ends with the inner surfaces of the opposite end walls 24 of the bottom section. As will be noted from Figure 5, the partitions 40 at each end of the bottom section are extended longitudinally of said section in the direction of the mid-length portion, the partitions converging toward said mid-length portion to divide the interior of the container 8, at each end of the container, into a plurality of side-by-side, longitudinally extending, tapered chambers each of which is adapted to receive a single stem S. Each chamber, as will be noted, is in communication with one of the stem-receiving recesses 30.

The inner ends of the partitions 40 terminate short of the narrow mid-length portion of the bottom section, so as to provide a clear area medially between opposite ends of the container, in which the container is free of obstructions from side to side thereof.

A cover plate 42 constitutes part of the cover section 12, and is provided, medially between its opposite ends, with a transverse groove 44 aligned with the groove 16 of the bottom section. The cover section 12, in this connection, is so formed as to have its side and end walls in alignment with the side and end walls of the bottom section complementary thereto, and thus is integrally molded with depending side walls 46 that converge from the opposite ends of the cover section in the direction of the narrowed mid-length portion thereof. Arcuate end walls 48 are also provided upon the cover section, and are adapted to engage the end walls of the bottom section when the respective sections are interfitted with one another.

In the inner surfaces of the side and end walls 46, 48 respectively, I form peripherally extending locking grooves 28 complementary to the locking ribs 49 of the bottom section (Figure 4) for detachably holding the cover and bottom sections together when they are assembled to form the completed container 8.

In the respective end walls 48 of the cover section 12, I form arcuate, transversely spaced, notches 50 registering with the stem-receiving recesses 30 of the bottom section in the assembled position of the section.

It is desirable to permit the cover and bottom sections to be separated readily whenever desired, even though they are firmly locked when in use. To this end, opposed longitudinal indentations 52, 54 are formed in the side walls of the sections, said indentations defining a slot adapted to receive the edge of a coin or the like, thus to permit the sections to be pried apart with ease.

Ordinarily, the holder is attached directly to the clothing of a wearer, by means of the pins 36. However, in some instances it may be desired to wear the corsage on a choker placed about the neck of the wearer, and to this end, I provide parallel, transverse rods 56 at the mid-length portion of the container, said rods being spaced outwardly from and being fixedly secured to the bottom face of the container, that is, to bottom plate 14 of the bottom section to form loops by which the item may be attached to the person of the wearer.

The rods 56 are rigid at their opposite ends with longitudinally disposed, parallel rods 58, the rods 58 bridging the bottom groove 16. In practice, the rods 56 and 58 might all be separately formed and embedded in the bottom section during the molding of the bottom section. Or, as shown in the drawing, said rods 56 and 58 can be rigidly connected to form a rectangular framework having depending feet at the several corners thereof extending into the outer surface of the bottom section and firmly embedded in the bottom plate 14.

The longitudinal rods 58 are adapted for extension of a wristband or the like, through the space between said rods 58 and the adjacent surface of the bottom section, whereby the corsage may be worn upon the wrist.

When the corsage is worn about the neck on a choker, the corsage holder would be horizontally disposed, by reason of the placement of the rods 56. When, however, the corsage is worn upon the wrist, the corsage holder would be disposed longitudinally of the wearer's arm, by reason of the particular placement of the rods 58.

In the container 8, one or more pads 60 of compressed cotton or the like are placed, said pads extending fully from side to side of the bottom section (Figure 5), in the clear area hereinbefore mentioned. The inner ends of the partitions 40 abut against the respective pads, and hold said pads firmly in position between the partitions and the transverse partition 38. If no partition 38 is used, a single pad 60 of appreciable width can be placed in the clear mid-length portion of the container, the partitions 40 at each end of the container abutting at their inner ends against the opposite sides of said single pad.

By reason of the form and arrangement of the pads 60, said pads define inner end walls for the tapered, stem-receiving chambers of the container, and on insertion of stems through the apertures 30, the cut ends of the stems can be placed in direct contact with the pad, so as to receive moisture from the pad after the pad has been moistened with a few drops of water. Thus, the flowers will be kept fresh, and at any time, the wearer of the corsage can pry the cover and bottom sections apart, for the purpose of remoistening the pads 60.

It should be noted that the ferns F customarily used in forming corsages need not be moistened, and hence are extended through the fern-receiving apertures 32 without regard as to whether the stems of the ferns are placed in contact with the pads 60.

It is believed important to note that the particular formation of the sections is such as to cause the completed container A to have a plurality of tapered chambers at each end, each of which is adapted to hold a separate stem S, thus to cause the stems to extend outwardly from the end of the container adjacent thereto in a diverging relationship particularly well shown in Figure 1. This adds to the attractiveness of the corsage.

It is also considered to be an important characteristic of the construction that within the container, each stem is kept separate from each other stem, so that the stems cannot be crushed against one another within the container in a manner which would tend to cause rapid deterioration of the corsage.

In use, the pads 60, after being suitably moistened, are placed in the position illustrated in Figure 5, and the stems S of the flowers are pressed into the recesses 30 so as to be in contact, at their cut ends, with said pads. The ferns F are then extended through the apertures 32, after which the cover section 12 is applied to the bottom section and locked in engagement therewith by means of the cooperating locking ribs and grooves 28, 49, respectively.

An ornamental ribbon R is then arranged in any preferred manner effective for concealment of the container 8, and can if desired be folded into a plurality of oppositely extending loops such as those shown in Figure 1. The ends of said ribbon are then wrapped about the narrowed mid-length portion of the container, extending through the aligned grooves 16, 44. The grooves 16, 44 thus serve to prevent movement of the ornamentally tied ribbon relative to the corsage holder, and the ribbon itself acts to conceal the holder completely so as to impart a conventional appearance to the completed corsage.

It may be noted that the wrapping of the ribbon ends about the container within the grooves 16, 44 serves to provide insurance against the sections of the container becoming accidentally separated.

I believe it is obvious that the particular number of stem-receiving apertures defined by the recesses 30 and notches 50, and stem-receiving chambers communicating therewith is not critical to successful use of the corsage holder, and either more or less of said apertures and chambers can be embodied in the construction, as desired.

It is preferred to line the recesses 30 and notches 50 with sponge rubber lining pieces 62 or other material of like characteristics. This is desirable to cause the stems S to be gripped firmly without, however, crushing the same. The stems of flowers, it should be noted, vary in thickness and the soft, resilient linings are desirable to permit engagement of stems of any thickness. It is particularly important that there be a firm grip on the stems to prevent loss of those flowers, not shown, that would extend downwardly in a complete corsage.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A corsage holder comprising: complementary, interfitting, bottom and cover sections adapted to form a hollow container, said container having flower stem-receiving apertures formed in the wall thereof; and partitioning means dividing said container interiorly thereof into a plurality of stem-receiving chambers each of which is in communication with one of said apertures for engaging flower stems inserted through the apertures and holding the flowers on the stems in selected positions relative to one another.

2. A corsage holder comprising: complementary, interfitting, bottom and cover sections adapted to form a hollow container, said container having stem-receiving apertures formed in the wall thereof; and partitioning means dividing said containers interiorly thereof into a plurality of stem-receiving chambers each of which is in communication with one of said apertures for holding flower stems inserted through the apertures in selected positions relative to one another, said sections respectively having grooves aligned transversely of the container and adapted to receive a corsage ribbon wrapped about the container in a section-encircling position and hold the same against movement from said position.

3. A corsage holder comprising: a pair of generally flat, shallow, bottom and cover sections interfitting with one another to form a hollow, flat container for receiving the stems of flowers and the like, said container having stem-receiving apertures formed in opposite ends thereof; and partitioning means dividing said container interiorly thereof into a plurality of stem-receiving chambers each of which is in communication with one of said apertures for holding stems inserted through the apertures in selected positions relative to one another, and said sections having exteriorly disposed grooves extending transversely intermediate the ends thereof for receiving a corsage ribbon wrapped thereabout.

4. A corsage holder comprising: a pair of generally flat, shallow, bottom and cover sections interfitting with one another to form a hollow, flat container for receiving the stems of flowers and the like, said sections being narrowed at their mid-length portions and being increased progressively in width toward their ends, said container having stem-receiving apertures extending through opposite ends thereof; longitudinal partitions extending from the ends of the sections toward said mid-length portions thereof and converging in the direction of said mid-length portions to divide the interior of the container into a plurality of tapered, stem-receiving chambers each of which is in communication with one of said apertures for holding stems inserted through the apertures in selected, diverging positions relative to one another, said sections respectively having exteriorly disposed, aligned grooves extending transversely of the mid-length portions thereof, said grooves being adapted to receive a corsage ribbon wrapped about the container in a section-encircling position for holding the ribbon against movement from said position; and at least one water-absorbent pad disposed within the container at the narrowed mid-length portions of the sections and arranged equidistantly from said ends of the sections, said pad forming one wall of each chamber for abutting of the several inserted stems thereagainst.

5. As a new article of manufacture, a corsage form and flower preserver comprising a container having a constriction intermediate its ends, an absorbent pad within the container adjacent the constriction and defining plant stem receiving chambers within the container adjacent opposite ends thereof, and said container having flower stem accommodating openings extending through opposite ends thereof and communicating with the chambers for holding in selected relation to one another flowers carried by stems contacting the absorbent pad, and partition walls carried by the container and extending longitudinally through the chambers for engaging the stems extending through the openings and limiting lateral movement of the flowers.

6. As a new article of manufacture, a corsage form and flower preserver comprising a hollow bottom section having a wholly open top and a transverse constriction intermediate its ends, an absorbent pad mounted within the bottom section and extending transversely thereof adjacent the constriction for defining plant stem receiving chambers adjacent opposite ends of the bottom section, opposite ends of the bottom section having recesses extending therethrough and opening through the edge adjacent the open side thereof for receiving stems of flowers, and a mating cover section removably mounted on the bottom section for completely enclosing stems extending through the recesses and holding them in the recesses and in contact with the absorbent pad.

7. As a new article of manufacture, a corsage form and flower preserver comprising a hollow bottom section having a wholly open top and a transverse constriction intermediate its ends, an absorbent pad mounted within the bottom section and extending transversely thereof adjacent the constriction for defining plant stem receiving chambers adjacent opposite ends of the bottom section, which increase in width as they recede from the absorbent pad, transversely spaced partitions carried by the bottom section and extending longitudinally through the chambers between the absorbent pad and the ends of the bottom section, said partitions diverging as they recede from the absorbent pad, opposite ends of the bottom section having flower stem receiving recesses extending therethrough which open through the edges thereof adjacent the open top of the bottom section, and a mating cover section removably carried by the bottom section.

8. As a new article of manufacture, a corsage form and flower preserver comprising a container having a constriction intermediate its ends, an absorbent pad within the container adjacent the constriction and defining plant stem receiving chambers within the container adjacent opposite ends thereof, and said container having flower stem accommodating openings extending through opposite ends thereof and communicating with the chambers for holding in selected relation to one another flowers carried by stems contacting the absorbent pad, and loops carried by the container and extending outwardly therefrom intermediate the ends thereof for supporting said container on the person of the wearer.

References Cited in the file of this patent

UNITED STATES PATENTS

| | | |
|---|---|---|
| 566,821 | Vanalstine | Sept. 1, 1896 |
| 607,636 | Donnelly | July 14, 1898 |
| 613,059 | Briggs | Oct. 25, 1898 |
| 930,304 | Mate | Aug. 3, 1909 |
| 1,044,260 | Schloss | Nov. 12, 1912 |
| 1,213,235 | Meiers | Jan. 23, 1917 |
| 1,379,340 | Hegamin | May 24, 1921 |
| 1,541,923 | Cunningham | June 16, 1925 |
| 1,732,213 | Alland | Oct. 29, 1929 |
| 2,218,157 | Seidel | Oct. 15, 1940 |
| 2,299,597 | Schilling | Oct. 20, 1947 |